United States Patent [19]

Cash

[11] 4,430,203

[45] Feb. 7, 1984

[54] HYDROTREATING OR HYDROCRACKING PROCESS

[75] Inventor: Dennis R. Cash, Novato, Calif.

[73] Assignee: Chevron Research Company, San Francisco, Calif.

[21] Appl. No.: 346,209

[22] Filed: Feb. 5, 1982

[51] Int. Cl.³ .............................................. C10G 65/04
[52] U.S. Cl. ............................... 208/210; 208/254 H; 208/59
[58] Field of Search ...................... 208/210, 254 H, 59

[56] References Cited

U.S. PATENT DOCUMENTS

| | | | |
|---|---|---|---|
| 2,833,698 | 5/1958 | Patton et al. | 208/210 |
| 2,987,468 | 6/1961 | Chervenak | 208/99 |
| 3,236,764 | 2/1966 | Den Herder et al. | 208/210 |
| 3,418,234 | 12/1968 | Chervenak et al. | 208/59 |
| 3,519,557 | 7/1970 | Pruiss | 208/143 |
| 4,016,067 | 4/1977 | Fischer et al. | 208/89 |
| 4,021,330 | 5/1977 | Satchell, Jr. | 208/89 |

*Primary Examiner*—Delbert E. Gantz
*Assistant Examiner*—O. Chaudhuri
*Attorney, Agent, or Firm*—Burns, Doane, Swecker & Mathis

[57] ABSTRACT

A multistage hydrocracking or hydrotreating process wherein a two-phase reaction mixture of a hydrogen rich gas stream and liquid hydrocarbon is passed through a series of spaced catalyst beds and reaction vapors are withdrawn at each interspace between beds and replaced with hydrogen. Such withdrawal and replacement reduces the partial pressure of $NH_3$ and/or $H_2S$ in the reaction mixture entering the bed succeeding each interspace, thereby increasing the reaction rate between hydrogen and the liquid hydrocarbon.

7 Claims, 2 Drawing Figures

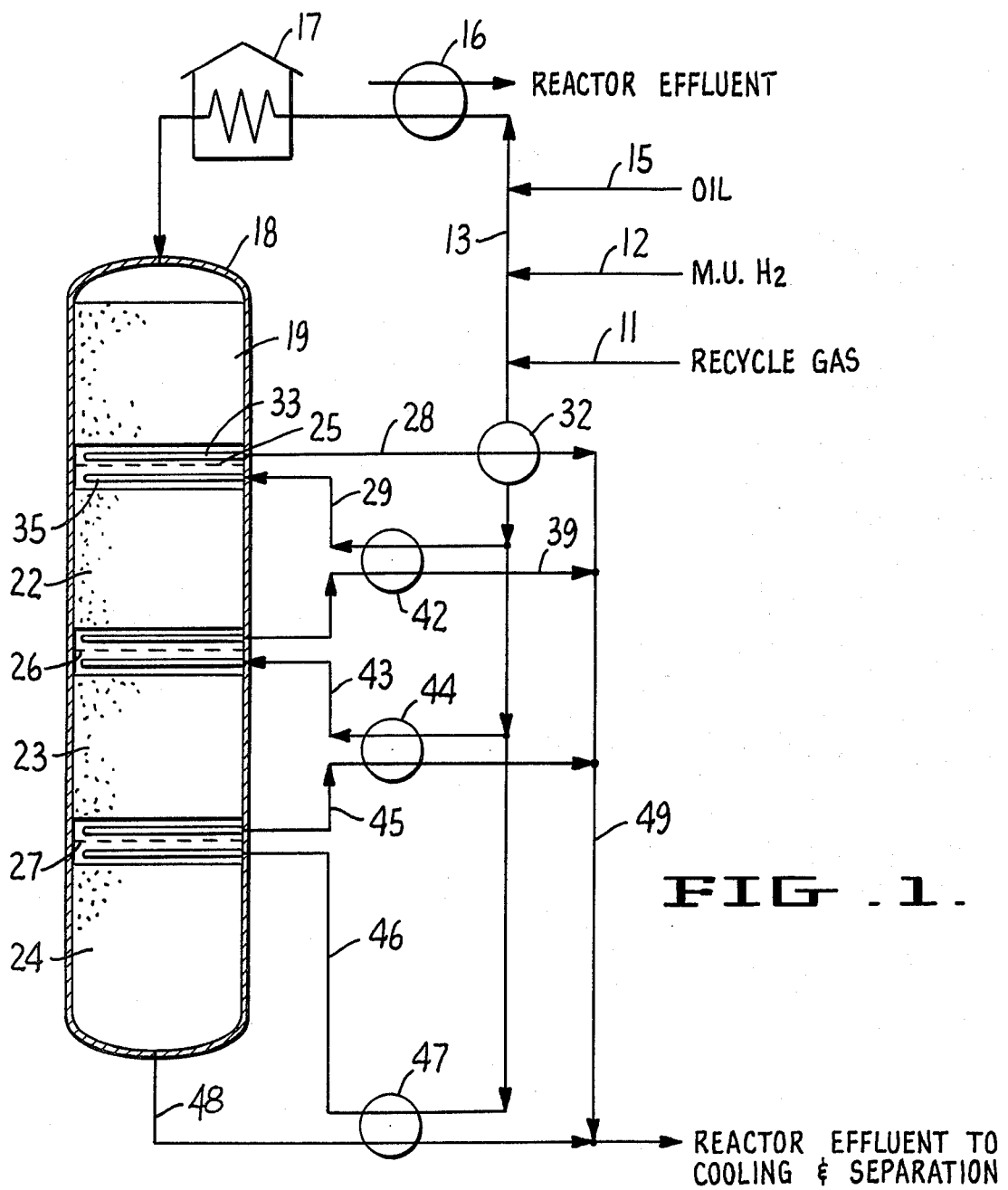
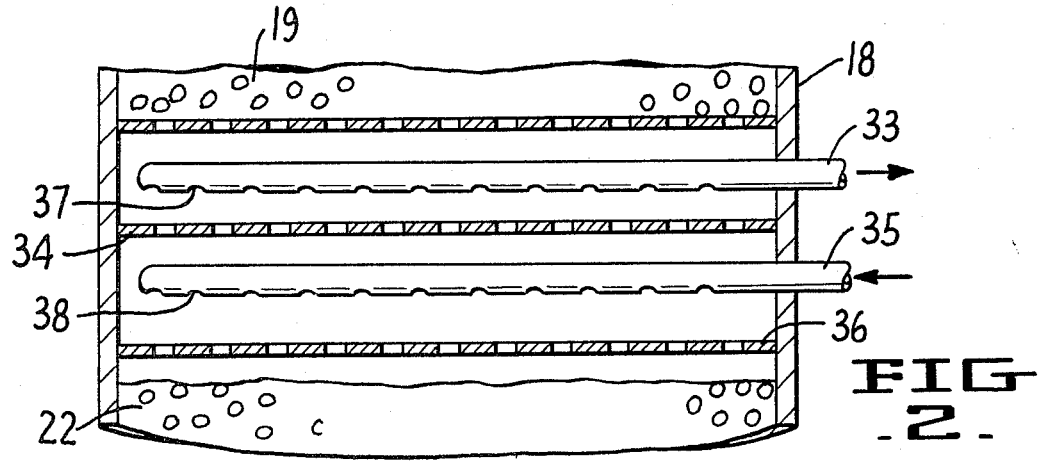

HYDROTREATING OR HYDROCRACKING PROCESS

BACKGROUND OF THE INVENTION

1. Field of the Invention

The invention relates to a multi-stage hydrotreating or hydrocracking process wherein reaction vapors are withdrawn between stages and replaced with hydrogen.

2. Description of the Prior Art

Hydrotreating and hydrocracking both involve catalytically promoted reactions between hydrogen and a liquid hydrocarbon. Hydrotreating is used primarily to remove nitrogen, sulfur, and other impurities in hydrocarbon feedstocks to other refinery processes. The hydrogen reacts with the nitrogen and sulfur contaminants in the feedstock to form ammonia and hydrogen sulfide. On the other hand, hydrocracking is typically used to upgrade refractory middle boiling or residual hydrocarbons. However, it too is a treating process since hydrogen combines with nitrogen and sulfur impurities in the hydrocracking feed and converts them to ammonia and hydrogen sulfide.

In accordance with Le Chatelier's principle the reaction rates of hydrotreating or hydrocracking may be increased by removing ammonia and/or hydrogen sulfide, as the case may be, from the reaction mixture. One method currently used to do this in hydrocracking is to carry out the process in two stages separated by a distillation. The effluent from the first stage is cooled and depressurized, reheated and fed to a distillation column, and the distillate is repressurized and fed to the following stage. In prior art hydrotreating processes multistage reactors were used with an interstage flash to remove ammonia and hydrogen sulfide. See, for instance, U.S. Pat. Nos. 3,159,564, 3,761,399, 3,907,667, 3,926,784, and 4,016,069.

A main object of the present invention is to provide a process for removing hydrogen sulfide and/or ammonia from a multistage hydrocracking or hydrotreating process that does not involve separate interstage treatment of the entire interstage effluents.

SUMMARY OF THE INVENTION

The invention is an improvement in a process in which a reaction mixture of a hydrogen rich gas stream and a liquid hydrocarbon containing at least one of either a nitrogen impurity or a sulfur impurity is passed under hydroprocessing conditions through a hydroprocessing reaction zone containing a series of fixed spaced hydroprocessing catalyst beds. The improvement comprises withdrawing vapors containing at least one of either ammonia or hydrogen sulfide from at least one of the interspaces between the beds and replacing the withdrawn vapors with fresh hydrogen introduced into the interspace.

BRIEF DESCRIPTION OF THE DRAWINGS

In the drawings, which are not to scale, FIG. 1 is a partly schematic flow diagram illustrating one embodiment of the invention; and FIG. 2 is an enlarged sectional view of a portion of the apparatus shown in FIG. 1. Details of catalyst support and of remixing of the gas and oil phases prior to downflow into the next bed are not shown.

DETAILED DESCRIPTION OF THE INVENTION

As used herein the term "hydroprocess" means a process in which hydrogen is reacted with a hydrocarbon on the surface of a heterogeneous hydroprocessing catalyst at process conditions under which the hydrocarbon is in a liquid state. The term includes the processes that are known in the art as hydrocracking and hydrotreating.

As used herein the term "hydrocarbon" includes feedstocks that are charged to hydroprocesses in the refining of oils obtained from petroleum, tar sand, shale, coal or other sources and which contain sulfur and/or nitrogen impurities.

FIG. 1 depicts an apparatus that may be used to hydrocrack or hydrotreat hydrocarbon feedstocks. Recycle and makeup hydrogen from lines 11 and 12 are combined in line 13 and mixed therein with liquid hydrocarbon feed from line 15. The two-phase mixture is passed through a heat exchanger 16 and furnace 17 and heated thereby to the appropriate temperature for hydrocracking or hydrotreating, as the case may be. The heated two-phase mixture is carried from the furnace to the top of a multi-bed downflow reactor vessel 18. Vessel 18 contains four spaced, fixed catalyst beds 19, 22, 23, and 24 that are separated by interspaces 25, 26, and 27. However, the invention could apply to any system with two or more beds. As the liquid hydrocarbon passes through bed 19 it is partly converted to the desired product with by-product $NH_3$ and $H_2S$ being formed. The two-phase effluent from bed 19 passes into interspace 25. The liquid phase of the effluent comprises converted and unconverted liquid hydrocarbon and the vapor phase comprises hydrogen and by-produce gases including $NH_3$ and/or $H_2S$ depending upon the nature of the impurities in the liquid hydrocarbon feedstock. Part of the vapor phase in interspace 25 is withdrawn from the upper portion of the interspace via line 28. The portion of vapor withdrawn is replaced with hydrogen introduced into the lower portion of the interspace (i.e., below the vapor withdrawal point) via lines 13 and 29. The heat in the vapors withdrawn from interspace 25 is exchanged with the replacement hydrogen in a heat exchanger 32. The amount of gas withdrawn, the amount returned, and the amount of heat exchanged will vary from case to case depending on the desired reactor temperature profile and the economics of gas handling relative to catalyst life.

FIG. 2 shows the details of the internal devices contained in the interspace to effect withdrawal of reaction vapors, replacement thereof with recycle hydrogen, and remixing of the two-phase reaction mixture. These internal devices are: a vapor withdrawal device 33; a sieve tray 34; a hydrogen injection device 35; and a two-phase distribution tray 36. Vapor withdrawal device 33 consists of a hollow ring having perforations 37 in its underside. The ring is connected to line 38. The vapors pass upwardly through the perforations into the lumen of the ring and flow therefrom into line 28. Hydrogen injection device 35 is positioned below the vapor withdrawal device in the interspace. It, too, consists of a hollow ring havng perforations 38 in its underside. The injection device is connected to line 29. Replacement hydrogen flows from line 29 into the lumen of device 35 and through perforations 38 into the interspace. There it mixes with the portion of the vapor phase not withdrawn and the downflowing liquid phase. The sieve tray mounted transversely in the interspace between the vapor withdrawal device and hydrogen injection device assists in the mixing and restricts back flow of cooler, purer gas to the withdrawal device. The replacement hydrogen may also be used to quench (lower the temperature of) the reaction mixture, if desired. The extent of such quenching will depend upon the amount of hydrogen injected into the interspace and the temperature of that hydrogen. The reaction mixture leaves the interspace via the two-phase distribution tray. The distribution tray consists basically of a flat perforated disc mounted transversely at the bottom of the interspace below the hydrogen injection device. The distribution tray serves to feed the two-phase reaction mixture uniformly to the succeeding catalyst bed 22.

The partial withdrawal of reaction vapors from the interspace and replacement thereby with hydrogen of substantially greater purity has the effect of decreasing the partial pressure of $NH_3$ and/or $H_2S$ and increasing the hydrogen partial pressure while maintaining the total pressure of the reaction mixture passing from bed 19 to bed 22. As indicated above, this enhances the desired reaction rate between hydrogen and the unconverted liquid hydrocarbon feedstock within bed 22.

The process sequence described above may be repeated in bed 22 and interspace 26 and in bed 23 and interspace 27. That is, the liquid hydrocarbon is progressively converted as it passes through the beds and reaction vapors containing $NH_3/H_2S$ are withdrawn and replaced with hydrogen at each interspace. In this regard both of the interspaces 26, 27 is equipped with internal devices that are duplicates of those contained in interspace 25. The desirability of repeating the removal and replacement with recycle hydrogen will depend on the extent to which the nitrogen and sulfur have been reacted to form $NH_3$ and $H_2S$ in the preceding bed. If desired, the reaction vapors from interspace 26 are removed therefrom via line 39. Heat in the removed vapors is exchanged to the hydrogen injected into interspace 25 in a heat exchanger 42. Hydrogen is injected into interspace 26 by line 43 and is heated before injection by exchange in exchanger 44 with reaction vapors withdrawn from interspace 27 via line 45. The hydrogen injected into interspace 27 via line 46 is heated by exchange in exchanger 47 with the effluent leaving bed 24 and the bottom of the reactor vessel via line 48. The vapors withdrawn from the interspaces and combined in line 49 and mixed with the reactor effluent from line 48. The heat from the combined reaction product is exchanged with the feed and the reaction product then further cooled and fractionated.

When the above described process is used to hydrotreat feedstocks to remove sulfur and nitrogen impurities the following process conditions will typically be used: reaction temperature, 400°–900° F.; pressure, 500 to 5000 psig; LHSV, 0.5 to 20; and overall hydrogen consumption 500 to 2000 scf per barrel of liquid hydrocarbon feed. The hydrotreating catalyst for the beds will typically be a composite of a Group VI metal or compound thereof, and a Group VIII metal or compound thereof supported on a porous refractory base such as alumina. Examples of hydrotreating catalysts are alumina supported cobalt-molybdena, nickel sulfide, tungsten-nickel sulfide, cobalt molybdate and nickel molybdate. In hydrotreating, the proportion of vapors continuously withdrawn at each interspace should be sufficient to cause a significant reduction in the $NH_3$ and/or $H_2S$ partial pressure. Preferably enough vapors are withdrawn and replaced to reduce the partial pressures to below about one psia of $NH_3$ and about four psia of $H_2S$. Typically about 50% to 100% by volume of the gas will be withdrawn, more usually about 80% to about 95% by volume. A corresponding amount of hydrogen will be injected continuously into the interspace to replace the withdrawn vapors. The injected hydrogen should not reduce the temperature of the reaction mixture below the minimum temperature required to achieve the desired extent of hydrotreating in the succeeding bed.

Correspondingly, when the process is used to hydrocrack feedstocks the following operating conditions will normally prevail: reaction temperature, 400°–950° F.; reaction pressure 500–5000 psig; LHSV, 0.1 to 15; and hydrogen consumption 700–2500 scf per barrel of liquid hydrocarbon feed. The hydrocracking catalysts used for the beds will typically be a Group VI, Group VII, or Group VIII metal or oxides or sulfides thereof supported on a porous refractory base such as silica or alumina. Examples of hydrocracking catalysts are oxides or sulfides of Mo, W, V, and Cr supported on such bases. Usually, about 50% to 100% by volume of the gas will be withdrawn, more usually about 80% to 95% by volume. As in hydrotreating processes, the hydrogen injected into the interspaces should not be such as to reduce the temperature of the reaction mixture below that required to effect the desired amount of conversion in the succeeding stage.

Modifications of the process that is shown in the drawings and described above that are obvious to those of ordinary skill in the refinery process art are intended to be within the scope of the invention.

I claim:
1. A process for hydroprocessing comprising:
(a) passing a two-phase reaction mixture of a hydrogen rich gas and a liquid hydrocarbon containing at least one of either a nitrogen impurity or a sulfur impurity through a single vessel hydroprocessing reaction zone containing a series of fixed spaced hydroprocessing catalyst beds, at least two adjacent beds being separated by a first perforated tray, a second perforated tray and a third perforated tray, said first perforated tray and said second perforated tray defining a vapor withdrawal space and said second perforated tray and said third perforated tray defining a hydrogen introduction space;
(b) withdrawing vapors containing at least one of either ammonia or hydrogen sulfide from said vapor withdrawal space;
(c) introducing hydrogen into the hydrogen introduction space wherein the amount of hydrogen is substantially equal to the amount of withdrawn vapors; and
(d) passing the liquid hydrocarbon directly to the next bed.

2. The process of claim 1 wherein the vapors are withdrawn in a direction away from the flow of the liquid hydrocarbon and the hydrogen is introduced in a direction cocurrent with the flow of the liquid hydrocarbon.

3. The process of claim 1 wherein there are at least three beds in the series.

4. The process of claim 1 or 3 wherein the proportion of vapors withdrawn from said vapor withdrawal space is sufficient to significantly reduce the partial pressure of ammonia or hydrogen sulfide in the reaction mixture entering the succeeding bed in the series.

5. The process of claim 4 wherein the partial pressure of ammonia is reduced to below about one psia and the partial pressure of hydrogen sulfide is reduced to below about four psia.

6. The process of claim 4 wherein the said proportion is about 50% to about 100% by volume.

7. The process of claim 4 wherein said proportion is about 80% to about 95% by volume.

* * * * *